No. 609,621. Patented Aug. 23, 1898.
A. MELIN.
SELF LOCKING SEAL.
(Application filed Sept. 15, 1897.)
(No Model.)
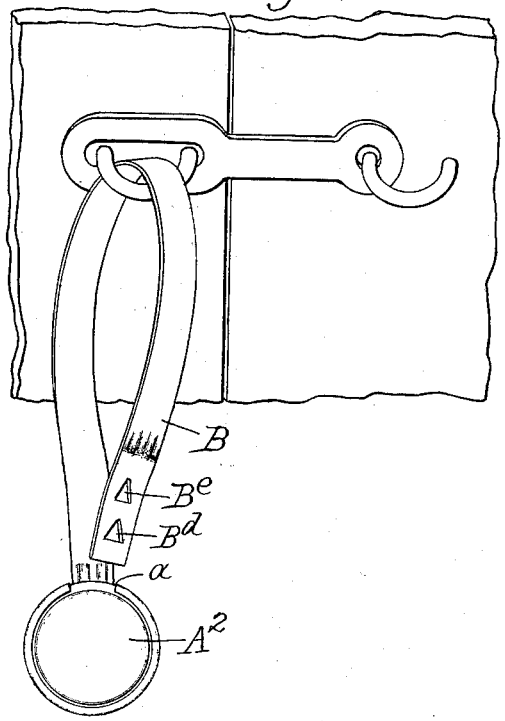
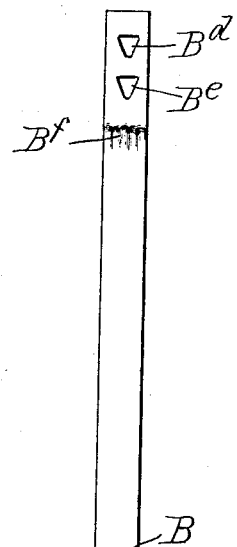
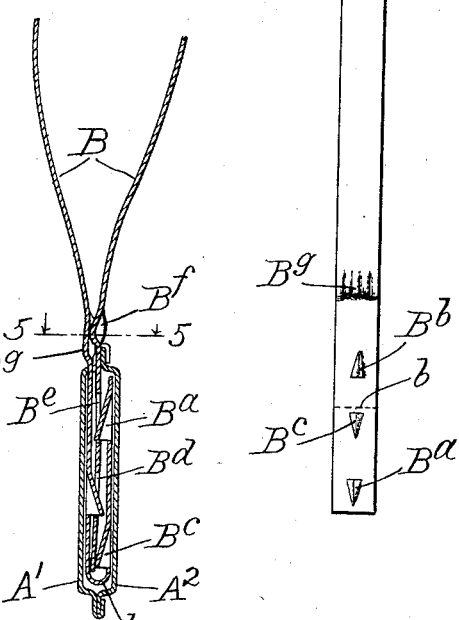
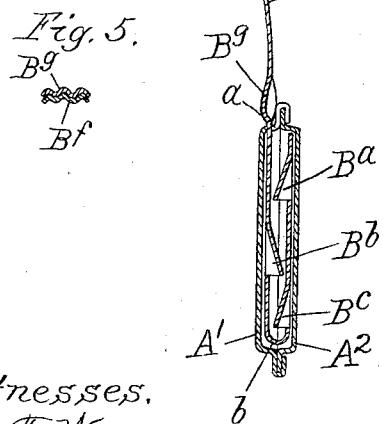
Witnesses.
E. T. Wray.
Jean Elliott
Inventor.
August Melin
By Burton & Burton
his attys.

UNITED STATES PATENT OFFICE.

AUGUST MELIN, OF CHICAGO, ILLINOIS.

SELF-LOCKING SEAL.

SPECIFICATION forming part of Letters Patent No. 609,621, dated August 23, 1898.

Application filed September 15, 1897. Serial No. 651,762. (No model.)

*To all whom it may concern:*

Be it known that I, AUGUST MELIN, a citizen of the United States, residing at Chicago, county of Cook, and State of Illinois, have invented certain new and useful Improvements in Self-Locking Seals, which are fully set forth in the following specification, reference being had to the accompanying drawings, forming a part thereof.

This invention relates to seals which are adapted to be used for sealing packages, baggages, railway-cars, &c., not for the purpose of preventing them from being opened, but for the purpose of requiring rupture or breaking of the seal upon their being opened, so that interference with them may be discovered upon inspection of the seal, and it relates to the specific class of seals of this type in which a securing device, usually of the form of a strap or strip of metal, is passed through or around the hasps, handles, or other fastenings of the thing to be secured.

It consists of improvements in the engaging devices.

In the drawings, Figure 1 is a plan of my improved seal with the securing device looped through the staple of a hasp-lock which it is designed to seal and ready for engagement in the seal. Fig. 2 is a plan of the strip of metal of which the securing device is made and which has also the engaging devices to be located within the seal formed in or on it. Fig. 3 is an exaggerated sectional view of the seal with the two ends of the strap constituting the engaging and securing devices engaged as when the seal is locked. Fig. 4 is a similar view showing the engaging devices within the seal-body, the seal not being locked. Fig. 5 is a section at the line 5 5 on Fig. 3.

$A'$ $A^2$ are two disks which together constitute the case of the seal, which is made of sheet metal in both said parts, the disk $A'$ being clenched peripherally about the edge of the disk $A^2$. Both the disks are sunken at the center in a suitable die and are assembled with the sunken faces toward each other, and the two thus inclose a flat chamber wherein the securing device is engaged. The case is apertured at $a$ to admit the two ends of the strip B, which constitutes the securing device and has formed integrally with it at one end the engaging device for the opposite end. The portion which is designed to be lodged and secured within the chamber of the seal has two engaging teeth $B^a$ and $B^b$ struck up from it, so as to project from the same side or surface of the strip, one quite near the end and the other at a distance back from the end sufficient to permit the strip to be folded at $b$ between two teeth and about one-third the distance from the tooth $B^b$ to the tooth $B^a$, so that when the strip is folded at the line $b$ upon itself the abrupt end of the tooth $B^a$ will be about as far from the similar end of the tooth $B^b$ as the latter is from the fold $b$. A smaller tooth or shoulder $B^c$ is struck from the metal of the strip, so as to project from the same side as the teeth $B^a$ and $B^b$ immediately adjacent to the fold $b$ on the side of the fold toward the tooth $B^a$, so that when the strip is folded at $b$ all three of the teeth project or intrude into the space between the facing surfaces of the strip as it is folded upon itself. The length of the portion of the strip from the fold $b$ to the end beyond the tooth $B^a$ is sufficient to extend across the entire diameter of the chamber of the seal, and this end is adapted to be lodged in this chamber, the running length of the strip extending out through the aperture $a$. The opposite end of the seal has two small notches $B^d$ and $B^e$ of the same form and of suitable size to admit the teeth $B^b$ and $B^a$, respectively, and of sufficient distance apart to admit, respectively, both said teeth at the same time—that is, their distance apart is the same as that of the teeth $B^b$ and $B^a$ after the fold at $b^a$ has been made.

To lock the seal, the end having the apertures $B^d$ and $B^e$ is inserted into the body of the seal through the aperture $a$ alongside the portion of the strip emerging from said aperture, and is thus entered between the body of the strip and the refolded end having the tooth $B^a$, and as it passes down between the two parts the apertures $B^d$ and $B^e$ engage the teeth $B^b$ and $B^a$, respectively, simultaneously, so that the seal is locked at two points at once, both within the body or chamber. In the inserting movement the extremity of the inserted end of the strip runs up onto the sloping tooth or shoulder $B^c$ before the tooth $B^b$ becomes engaged with the notch $B^d$, and the tooth thus tends to force the end of the strip over toward the side of the pocket or fold in the strip from which the tooth $B^b$ protrudes, so that as soon as the notch $B^d$ reaches the point of coincidence with the tooth $B^b$ engagement occurs by the reaction of the strip from the flexure to which it has been subjected toward the end by running up on said inclined tooth or shoulder. The depth or transverse dimension of the chamber of the seal is designed to be only sufficient to permit the inserted end of the securing-strip to be entered past the teeth $B^a$ and $B^b$. It will be noticed that the inserted end of the securing device is not only engaged at two points, as above stated, but is engaged in opposite directions—that is, the tooth $B^a$ intrudes from one side into the aperture $B^e$, while the tooth $B^d$ intrudes from the other side into the aperture $B^d$. This renders it exceedingly difficult to pick the lock by any of the expedients which are sometimes resorted to for that purpose.

To render it still more difficult to pick this lock, I prefer to provide the securing device with longitudinal corrugations $B^f$ $B^g$ at points which will overhang and cover the margin of the aperture $a$, through which the running end of the strip emerges, and the securing end is inserted into the body of the seal. These corrugations may, for still further security, be made to interlock, as shown in Fig. 5.

I claim—

1. In combination with the chambered body, the securing device consisting of a strap, one end of which is permanently secured to the body, and the other end of which is adapted to be inserted into the body alongside the secured end, and suitable engaging devices within the body; the adjacent portions of the securing device at the margin of the body having longitudinal corrugations struck in the metal and which terminate at and overhang the margin of the aperture through which the securing device is inserted.

2. In combination with the chambered seal-body, a securing device consisting of a strap, one end of which is permanently secured to the body, and the other end of which is adapted to be inserted into the body alongside the secured end, and suitable engaging devices within the body; the adjacent portion of the securing device at the margin of the body being provided with interlocking longitudinal corrugations which overhang the margin of the aperture through which the securing device is inserted.

3. In combination with a chambered seal-body, the securing device consisting of a metal strip having two apertures longitudinally separated; rigid ratchet-shaped teeth projecting from the opposite lateral walls of the seal-chamber having their sloping faces toward the entrance and their abrupt shoulders facing inward adapted to enter said apertures in the opposite sides of the strip when its longitudinal entering movement brings its apertures into registration with said rigid teeth respectively.

4. In combination with the chambered seal-body, the securing device having two apertures longitudinally separated; engaging devices located within the seal-body corresponding in position to said apertures in the securing device and adapted to enter them respectively when the securing device, in its longitudinal inserting movement, brings its apertures into registration with said engaging devices; said engaging devices consisting of rigid fixed ratchet-shaped teeth projecting from the opposite lateral walls of the seal-chamber, adapted to enter said apertures from opposite directions, and a deflecting-shoulder $B^c$ within the seal-body adapted to be encountered by the end of the securing device as it approaches locking position, tending to deflect said end in a direction to cause it to be held engaged with the nearest of said engaging devices.

5. In combination with a chambered seal-body, the securing device consisting of a flexible strip B having teeth $B^a$ and $B^b$ projecting from the same side, and folded upon itself toward the side from which said teeth project, and at a point between them adapted to bring the two teeth a short distance apart longitudinally with respect to the strip, the opposite end of the strip having apertures at a distance apart corresponding to that of the teeth after the strip is folded, and adapted to receive said teeth respectively.

In testimony whereof I have hereunto set my hand, in the presence of two witnesses, at Chicago, Illinois, this 11th day of September, 1897.

AUGUST MELIN.

Witnesses:
CHAS. S. BURTON,
JEAN ELLIOTT.